United States Patent [19]
Ellis

[11] 4,172,480
[45] Oct. 30, 1979

[54] PRODUCT FEED APPARATUS

[75] Inventor: James R. Ellis, Cypress, Calif.

[73] Assignee: Le Roy Enterprises, Inc., Las Alamitos, Calif.

[21] Appl. No.: 863,610

[22] Filed: Dec. 23, 1977

[51] Int. Cl.² .................... B65B 43/54; B65G 59/06
[52] U.S. Cl. ................................ 141/169; 99/450.4; 141/173; 198/424; 198/427; 414/119; 426/275
[58] Field of Search ............ 53/282; 99/450.4, 450.7; 141/9, 100, 103, 129, 167-170, 173-176, 178, 179, 181, 186, 270, 283, 392; 198/424, 427, 429; 214/8.5 F, 8.5 R, 1 BB; 221/68; 426/275; 414/119

[56] References Cited
U.S. PATENT DOCUMENTS

2,576,366  11/1951  Smith ............................ 214/8.5 F X
2,680,510  6/1954  Donath .......................... 214/8.5 F X

*Primary Examiner*—Frederick R. Schmidt
*Attorney, Agent, or Firm*—Fulwider Patton, Rieber, Lee & Utecht

[57] ABSTRACT

A product feed apparatus for transferring a plurality of products such as cookies from a single holder to a corresponding plurality of transversely spaced apart conveyor lines. The apparatus includes a shuttle guide extending across the conveyor lines and including a gate opening normally covered by a gate. The product holder carries a stack of the products and terminates in a feed opening at one extremity of the gate opening. A shuttle is supported on the shuttle guide for movement past the feed opening to a discharge position. The shuttle includes a number of product openings which come into successive alignment with the feed opening on movement of the shuttle toward its discharge position so that on location of the shuttle in its discharge position the products are located in the product openings in overlying relation to the gate. The products are then transferred to the conveyor lines on opening of the gate. The arrangement makes possible feeding of products to a number of conveyor lines from a single product holder. In one embodiment the product feed apparatus is combined with a second product feed apparatus and associated equipment to produce ice cream sandwiches.

6 Claims, 14 Drawing Figures

PRODUCT FEED APPARATUS

BACKGROUND OF THE INVENTION

1. Field of the Invention

The present invention relates to product feed apparatus and associated equipment for the manufacture of food products.

2. Description of the Prior Art

The particular problem in the prior art which prompted development of the present product feed apparatus is the difficulty of automatically transferring a plurality of cookies from a single cookie holder to a plurality of conveyor lines for subsequent combination of the cookies with other cookies to form ice cream sandwiches. However, as will be seen the present invention is also adapted to handle products other than cookies.

Ice cream cookie sandwiches are very popular and a number of dairies of modest size compete for this market. Typically, dairy employees arrange cookies on large trays, perhaps four cookies wide, and operate an ice cream machine having feed spouts or nozzles to deposit a layer of ice cream on each of the cookies. Other employees then manually place other cookies on top of the ice cream layers to form the desired sandwiches, exercising care to make the overall height of the sandwiches uniform to fit within standard size packages. The operation is tedious and time-consuming and requires an inordinately high number of employees. In addition, the uniformity and quality of the finished ice cream sandwiches occasionally suffer because of the manual character of the operation.

More complex equipment is available to form ice cream sandwiches, but such equipment is quite expensive and is not adapted to handle round cookies. In addition, the size and consequent lack of mobility render the equipment unsuitable for the average small dairy or like user. Moreover, such equipment is usually characterized by a feed mechanism having a number of product holders corresponding to the number of conveyor lines involved. Stacks of the products are held in these holders adjacent the conveyor lines, respectively, and a number of transfer devices are employed to move the products from each holder to the adjacent conveyor line. The equipment attendants must thus exercise care to ensure that all of the holders are kept filled during operation of the equipment.

Aside from the deficiencies of the product feed apparatus of the prior art, there is also a need for a relatively simple and inexpensive machine for manufacturing ice cream sandwiches or the like, particularly round sandwiches, in a rapid, uniform, and reliable manner.

BRIEF SUMMARY OF THE INVENTION

According to the present invention, a product feed apparatus is provided which is adapted to transfer a plurality of products from a single holder to a number of transversely spaced apart conveyor lines. To accomplish this the apparatus includes an elongated shuttle guide adapted for location across the conveyor lines. The shuttle guide includes a gate opening adjacent the conveyor lines, and a gate is employed to normally cover this opening.

The single holder for the stack of products includes an extremity which defines a feed opening located adjacent the gate opening. A shuttle is movable on the shuttle guide past the feed opening of the holder and toward a discharge position in which a plurality of product openings in the shuttle are aligned with the gate opening in the shuttle guide and also with the plurality of conveyor lines. Each product opening has a depth approximately the thickness of the product so that as the shuttle moves past the feed opening the products are successively received in the product openings, and are thereafter moved into position overlying the gate. Upon operation of the gate the products are transferred onto the conveyor lines, respectively. The margins of the feed opening and each product opening in alignment therewith are spaced apart a distance less than the thickness of the product so that the product opening passing the feed opening will pick up no more than a single product.

A pair of the present product feed apparatuses are combined in a single machine, together with suitable filler feeding and associated equipment, to produce products such as ice cream cookie sandwiches. The invention includes a number of components operative to precisely align and assemble the product components for optimum product uniformity, the operation of such components being arranged to occur in a sequence effective to achieve this result with reliability and with a relatively low level of maintenance effort.

Other objects and features of the invention will become apparent from consideration of the following description taken in connection with the accompanying drawings.

DESCRIPTION OF THE PREFERRED EMBODIMENT

GENERAL ARRANGEMENT

Figure 1:
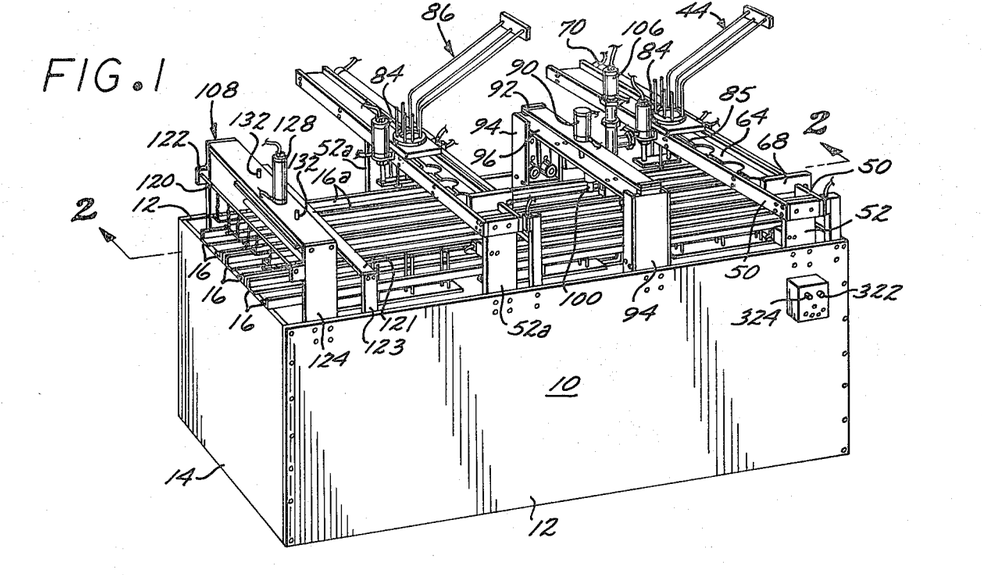
FIG. 1 is a perspective view of an ice cream sandwich machine embodying the present product feed apparatus.
Figure 2:
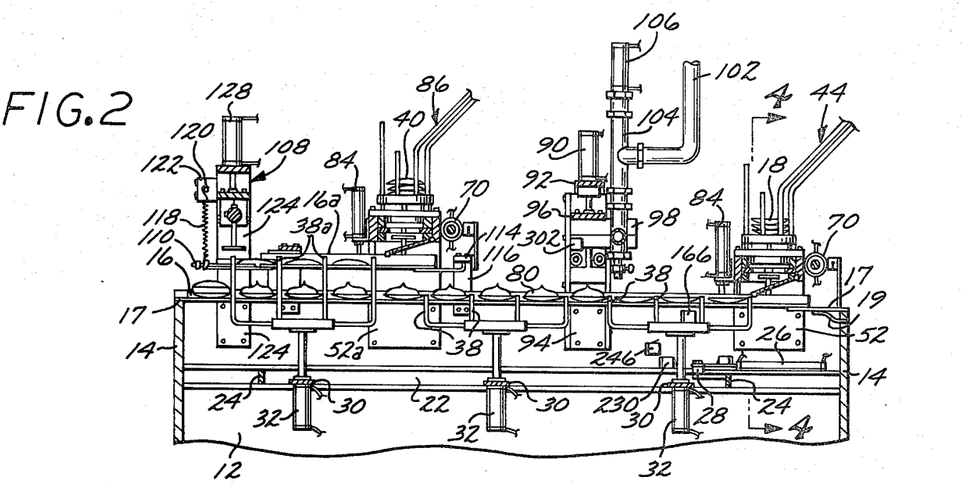
FIG. 2 is a view taken along the line 2—2 of FIG. 1.

Referring now to the drawings, and particularly to FIGS. 1 and 2, there is illustrated an ice cream sandwich machine 10 which is operative to automatically apply layers of ice cream to a plurality of cookies and thereafter assemble other cookies on top of thr ice cream layers to provide ice cream sandwiches. As will be seen, the machine 10 comprises a first feed station for depositing cookies onto a conveyor system which advances the cookies to a filling station where layers of ice cream are deposited on the cookies. These cookies are then advanced past a second feed station where additional cookies are fed onto an auxiliary conveyor system above the first conveyor system. Both sets of cookies are advanced to an assembly station where the second set of cookies is moved downwardly onto the first set of cookies and lightly compressed to form ice cream sandwiches of uniform height for packing in standard packages.

To effectuate the foregoing operation, the machine 10 comprises a rectangular frame having upstanding side walls 12 and end walls 14. Six elongated conveyor rails 16 of right-angular transverse cross section extend longitudinally of the machine 10 in parallel, spaced apart relation, each carrying an integral rod 17 at each of its opposite ends. The rods 17 rest upon the end walls 14 of the machine. In addition, rods 19 are welded to the rods 17 at the right ends of the rails 16, as seen in FIG. 2, and project below the rods 17 for receipt within suitable openings in the adjacent end wall 14. The rails 16 are easily removed for cleaning, and are constrained from rotating about their longitudinal axis by the action of the seated rods 19.

As best seen in FIGS. 1 and 4 through 6, the six rails are arranged in three pairs, the horizontal legs of each pair of rails 16 extending toward each other to form three conveyor lines. The vertical legs of each pair of rails 16 are spaced apart a distance great enough for the product, in this case a cookie 18, to rest upon the horizontal legs of the rails 16 with sufficient clearance relative to the vertical legs of the rails 16 for easy sliding or advancement of the cookie along the length of the rails 16.

The cookie 18 is oriented so that its generally flat surface is upwardly disposed and its convex surface is downwardly disposed.

COOKIE LONGITUDINAL ADVANCEMENT

Figure 3:
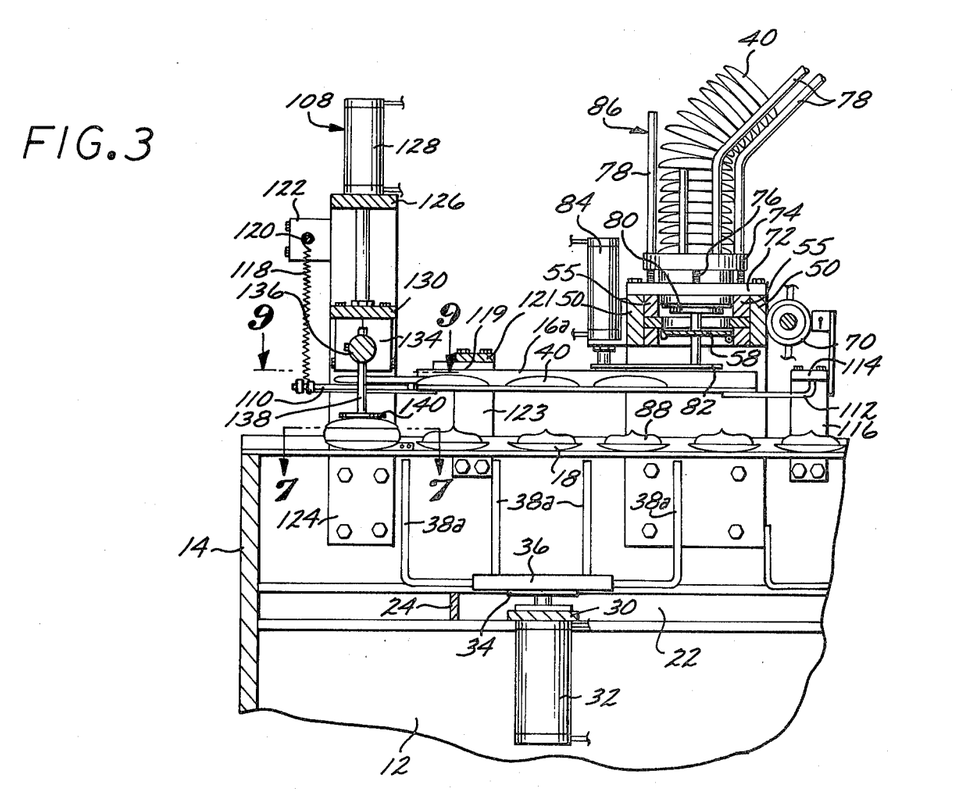
FIG. 3 is an enlarged view showing that portion of the machine which constitutes the product feed apparatus for the upper cookies.
Figure 12:
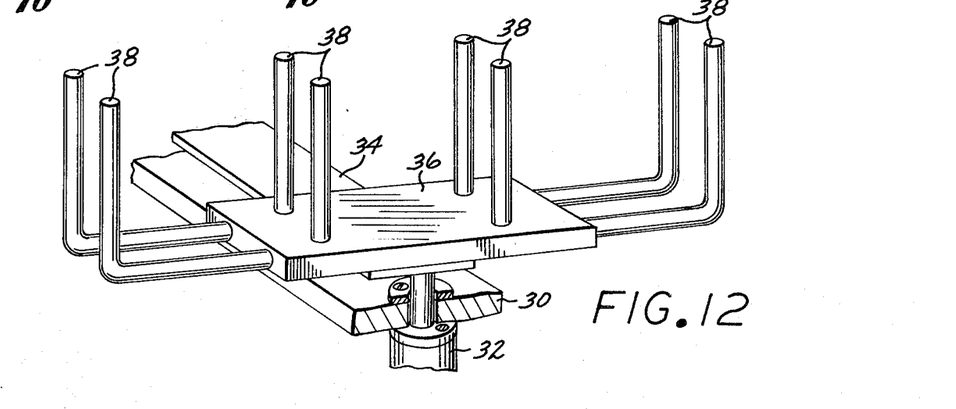
FIG. 12 is an enlarged detailed view of one of the cookie locators which is intermittently longitudinally advanceable to move the cookies along the conveyor lines.

The mechanisms for advancing the cookies 18 along the conveyor rails 16 are best illustrated in FIGS. 2, 3, and 12. Pairs of vertically spaced apart side rails 20 are attached to the interiors of the opposite side walls 12 to define opposite parallel channels or tracks to longitudinally slidably receive the side members 22 of a rectangular conveyor frame. The opposite extremities of the side members 22 are connected by elongated, transversely extending end members 24.

The conveyor frame is longitudinally reciprocated by actuation of an advance air cylinder 26 whose piston rod is suitably attached to the adjacent end of the conveyor frame by a coupling 28.

The conveyor frame includes three transversely extending support bars 30 secured at their opposite ends to the conveyor frame side members 22. The bars 30 are longitudinally spaced apart at equal intervals and each mounts at approximately its mid-portion a vertical location cylinder 32 having a piston rod. A platform support bar 34 is attached to the upper end of each piston rod and extends transversely in underlying relation to all of the conveyor rails 16. Three pin support platforms 36 are fixed to each of the three support bars 34 at spaced intervals so that the three platforms 36 underlie the three conveyor lines, respectively, defined by the three pairs of confronting conveyor rails 16. There are thus a total of nine pin support platforms 36.

Figures 4, 5, 6:
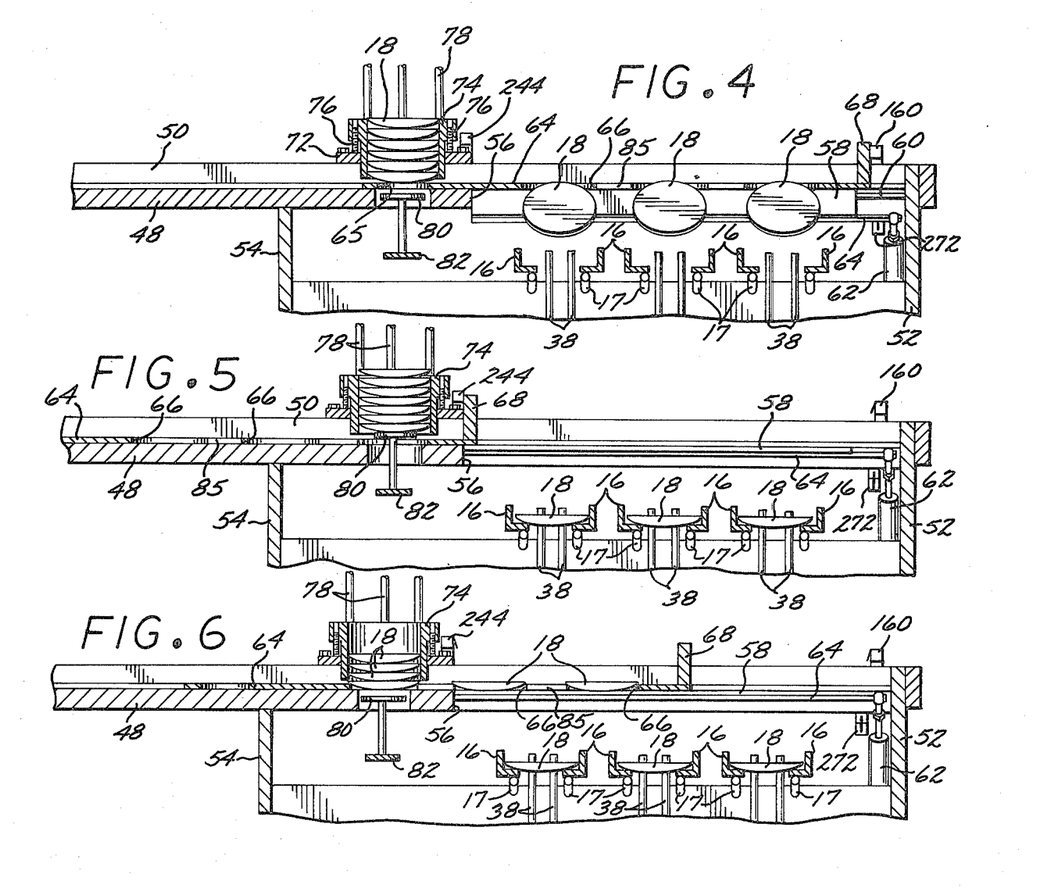
FIG. 4 is an enlarged view taken along the line 4—4 of FIG. 2 and illustrating the transfer of the cookies from the shuttle on operation of the gate.
FIG. 5 is a view similar to FIG. 4; and illustrating the movement of the shuttle from the discharge position illustrated in FIG. 4 to a ready position on the opposite side of the cookie holder.
FIG. 6 is a view similar to FIG. 5, but illustrating the shuttle moved from the position illustrated in FIG. 5 toward the discharge position of FIG. 4, and particularly showing the manner in which the cookies are successively received in the product openings in the shuttle.

Eight cookie locator or conveyor pins 38 are attached to each platform 36, four extending vertically upwardly from the platform 36, as best seen in FIG. 12. The pins 38 are longitudinally spaced apart a distance sufficient to accommodate the diameter of one cookie 18. The transverse spacing between the pins 38 is small enough to enable them to be projected through the space between the confronting rails 16 of each conveyor line, as seen in FIGS. 4 through 6.

As will be seen, an actuation of the advance cylinder 26 which extends its piston rod moves or longitudinally advances the conveyor pins 38 to the left, as viewed in FIG. 2.

An actuation of the location cylinders 32 which retracts their piston rods moves the conveyor pins 38 downwardly from between the rails 16, that is, from the positions shown in FIG. 2 to the positions shown in FIG. 3. This frees the pins 38 for longitudinal movement back or to the right, as viewed in FIG. 2. Such backward movement is caused by an actuation of the advance cylinder 26 which retracts its piston rod.

Each longitudinal movement of the pins 38 forward or backward is through a distance substantially equal to the diameter of a cookie 18. Thus, on completion of retraction or extension of the piston of the advance cylinder 26, the pins 38 will always be located for movement upwardly between the cookies 18, that is, from the positions illustrated in FIG. 3 to the positions illustrated in FIG. 2.

With particular reference to FIG. 3, it is noted that the last of the platforms 36, that is, the platform 36 located farthest to the left or at the discharge end of the machine 10, is provided with pins 38a which have a vertical height greater than the pins 38 of the first two platforms 36. Except for this, the pins 38 and 38a are identical. As will be seen, the greater height of the pins 38a permits their use in effecting periodic advancement of a plurality of cookies 40 as well as the cookies 18. The cookies 40 are identical to the cookies 18, except that they are inverted so that their flat sides are disposed downwardly.

COOKIE FEED APPARATUS

As best seen in FIGS. 1, 2, and 4 through 6, the product or cookie feed apparatus, generally designated 44, comprises an elongated, rectangular, transversely oriented shuttle frame or guide 46 having a base 48 characterized by a flat upper surface. The shuttle guide 46 includes vertically disposed, transversely extending side members 50 attached at their lower edges to the opposite sides of the base 48 to define a channel shaped shuttle track.

The right ends of the side members 50, as viewed in FIGS. 4 through 6, are attached to the upper end of a vertically elongated end plate 52 which is attached at its lower end to the adjacent machine side wall 12. The opposite extremity of the shuttle guide 46 extends beyond the opposite machine side wall 12 and, at the point where it overlies the side wall 12, the shuttle guide base 48 and side members 50 are secured to the upper extremity of a vertically disposed end plate 54 which is secured to the adjacent machine side wall 12.

An elongated, centrally located section of that portion of the shuttle guide base 48 which overlies the conveyor rails 16 is cut away or removed to form an elongated gate opening 56. The gate opening 56 is normally closed by a transversely elongated, rectangular plate or gate 58 whose upper surface in its closed position forms a planar continuation of the adjacent upper surface of the base 48. A hinge pin 60 is welded to the right edge margin of the gate 58, as viewed in FIG. 2, the opposite ends of the pin 60 being pivotally carried within suitable openings provided in the base 48 and the end plate 52.

The gate 58 is pivoted from the normally closed position of FIG. 5 to the open position of FIG. 4 by actuation of a gate cylinder 62. Such actuation extends the piston rod of the cylinder 62, which moves a transversely oriented rod 64 underlying the margin of the gate 58 opposite the hinge pin 60. This raises the gate 58 to the closed position of FIG. 5. Conversely, retraction of the piston rod allows the gate 58 to drop to the downwardly and forwardly inclined open position illustrated in FIGS. 2 and 4. As will be seen, this inclined position allows cookies 18 to slide gently off the gate 58 and onto the adjacent conveyor lines defined by the rails 16.

The flat bottomed channel defined by the upper surface of the shuttle guide base 48 and side members 50 receives a rectangular shuttle 64. The shuttle 64 comprises a flat plate having a thickness approximating the thickness of a cookie 18, although the shuttle thickness may be slightly greater or lesser than the cookie thickness and still operate properly. Elongated transversely extending retainers 55 are attached to the shuttle guide side members 50 in overlying relation to the side edges of the shuttle 64 so that the lower surfaces of the retainers 55 slidably constrain the shuttle 64 against upward movement during its slidable travel.

Three circular product or cookie openings 66 are provided in the shuttle 64, the openings 66 being spaced apart such that in the discharge position of the shuttle 64 illustrated in FIG. 4, the openings 66 will be located directly above and in vertical alignment with the three conveyor lines defined by the rails 16. The shuttle guide 46 is made of a length sufficient to permit the shuttle 64 to move from the discharge position of FIG. 4 to an opposite or ready position, which is illustrated in FIG. 5.

The right end of the shuttle 64, as seen in FIGS. 4 through 6, includes a vertical end member 68 which, as will be seen, operates in conjunction with suitable stops to establish the discharge and ready positions of the shuttle 64.

As generally indicated in FIGS. 1 and 2, an air operated shuttle cylinder 70 is attached to the outside of the shuttle guide side member 50 at the far side of the machine, as seen in FIG. 1, and its piston rod is attached to the end member 68 of the shuttle 64. The end member 68 includes an upwardly extending slot so that the end member 68 can slidably fit over the adjacent shuttle guide side member 50.

An actuation of the shuttle cylinder 70 which is effective to extend its piston rod will move the shuttle 64 to the discharge position of FIG. 4. Conversely, an actuation of the cylinder 70 which is effective to retract its piston rod will move the shuttle 64 to the ready position illustrated in FIG. 5.

A product or cookie holder is secured to the shuttle guide 46 for feeding cookies to the shuttle 64. The holder includes a rectangular base plate 72 bolted to the shuttle guide side members 50, and a cylinder 74 which is vertically slidably disposed within a central circular opening in the base plate 72. The upper extremity of the cylinder 74 includes an enlarged diameter collar which carried a plurality of usual set screws 76. The lower ends of the set screws 76 bear against the upper surface of the base plate 72. Adjustment of the screws 76 enables adjustment of the distance between the lower extremity of the cylinder 74 and the upper surface of the shuttle 64, the distance being made less than the thickness of a cookie 18 for a reason which will become apparent.

The diameter of the interior of the cylinder 74 is slightly larger than the diameter of a cookie 18 so that a stack of cookies 18 in the cylinder 74 can easily slide downwardly of its own weight. The open lower end of the cylinder 74 thus defines a feed opening located just to the left of and adjacent the gate opening 56, as seen in FIGS. 4 through 6.

A plurality of vertically extending holder pins 78 are secured at their lower ends to the top of the cylinder 74, the upper ends of at least three of the pins 78 being upwardly and rearwardly deformed to form an inclined cradle to facilitate receipt of a number of cookies 18. The cradled cookies descend until they pass through the shuttle cylinder feed opening, as seen in FIGS. 1 and 3.

A cookie support 80 normally engages the underside of the lowermost one of the cookies 18 in the stack of cookies in the cylinder 74, preventing the cookies from descending onto the shuttle 64, as seen in FIG. 5. The cookie support 80 is freely vertically movable through an opening provided in the shuttle guide base 48 and is connected by a vertical rod to a horizontally oriented plate 82 which is coupled to the piston rod of an air actuated cookie support cylinder 84 attached to the front shuttle guide side member 50, as seen in FIGS. 1 and 3. As will be seen, the second feed apparatus 86 shown in FIG. 3 is substantially identical to the feed apparatus 44, the main difference being that the feed apparatus 86 handles the plurality of cookies 40 which are to be complementally assembled to the cookies 18.

An actuation of the cookie support cylinder 84 effective to retract its piston rod will locate the cookie support 80 in the upper position illustrated in FIG. 5. In this position the support 80 projects upwardly through a round support opening 65 provided in the shuttle 64. Even though the support 80 projects through the shuttle 64, the shuttle is able to slide back to its ready position of FIG. 5 without interference because of the provision of a transversely elongated slot 85 in the base of the shuttle 64, as seen in FIGS. 1 and 4 through 6. The piston rod slides freely relative to the slot 85. Since the cookies are kept from descending, no cookies enter the shuttle during its movement toward its ready position.

An actuation of the support cylinder 84 which extends its piston rod will lower the cookie support 80 to the position illustrated in FIG. 4, permitting the cookies 18 to come into engagement with the upper surface of the shuttle 64. Since the distance between the lower extremity of the gate cylinder 74 and the upper surface of the shuttle 64 is less than the thickness of a cookie 18, movement of the shuttle 64 from the ready position of FIG. 5 enables cookies 18 to successively drop into the cookie openings 66 as the openings 66 become successively aligned with the feed opening of the cylinder 74, as seen in FIG. 6.

ICE CREAM FILLING

In FIGS. 1 and 3, there is illustrated the mechanism which deposits a layer of ice cream 88 upon each of the cookies 18 as the cookies pass through the filling station defined by the mechanism. The mechanism includes an air-actuated nozzle cylinder 90 attached to the horizontal, transversely extending plate 92 which is secured at its opposite ends to the upper extremities of a pair of vertical side frames 94 which are attached at their lower extremities to the opposite machine side walls 12.

The piston rod of the nozzle cylinder 90 extends downwardly through a suitable opening in the plate 92 and is attached to a transverse plate 96 underlying the plate 92. The opposite ends of the plate 96 are suitably carried in the side frames 94 for vertical slidable movement of the plate 96 on actuation of the nozzle cylinder 90. The details of the slidable mounting arrangement are not important to the present invention and are therefore omitted for brevity.

As generally seen in FIG. 2, a manifold 98 attached to the underside of the plate 96 is vertically moveable with the plate 96 and includes three nozzles 100, one of which is seen in FIG. 1, extending downwardly in vertical alignment with the conveyor lines defined by the three pairs of conveyor rails 16.

Upon an actuation of the nozzle cylinder 90 which is effective to extend its piston rod, the nozzles 100 are urged downwardly into close proximity with the upper flat surfaces of the three cookies 18 located in the filling station. Ice cream extruding out of the nozzles 100 mushrooms outwardly to a predetermined extent, at which point the flow of ice cream is cut off and the nozzle cylinder 90 is actuated to cause its piston rod to move the manifold 98 and nozzles 100 upwardly and away from the cookies 18 so that they can be advanced to the next station.

The mechanism for controlling the flow of ice cream to the manifold 98 is generally illustrated in FIG. 2. Ice cream is fed to the manifold 98 from a supply conduit 102, which is connected to a suitable source (not shown). The ice cream passes through a one-way check valve (not shown) which prevents backward flow, and then empties into a vertically extending reservoir 104. An air-actuated ice cream flow cylinder 106 is fixed to the top of the reservoir 104. Its piston rod extends downwardly and is connected to a piston located within the reservoir 104. Operation of the cylinder 106 in a direction to move the piston downwardly forces ice cream out of the reservoir 104 and through the nozzles 100. Conversely, retraction of the piston rod allows a renewed flow of ice cream to pass from the supply conduit 102 and into the reservoir 104. As will be seen, actuation of the flow cylinder 106 is synchronized with actuation of the nozzle cylinder 90 so that ice cream flows out of the nozzles 100 only when the nozzles 100 have been moved to their lower or discharge positions.

COMPLEMENTAL COOKIE FEED APPARATUS

The cookie feed apparatus 86 located to the left of the ice cream feed station is substantially identical to the already described cookie feed apparatus 44. Consequently, like numerals are employed to designate like components, and letter subscripts are employed to designate similar and corresponding components.

The apparatus 86 is different from the apparatus 44 only in that the vertical end plates 52a are made longer to locate the apparatus 86 at a level higher than the level of the apparatus 44. This greater height enables the apparatus 86 to feed the complemental cookies 40 onto an auxiliary conveyor system located above the conveyor system defined by the conveyor rails 16.

As best seen in FIGS. 1 through 3, the auxiliary conveyor system comprises three conveyor lines defined by three pairs of relatively short conveyor rails 16a substantially identical to the conveyor rails 16. The three conveyor lines are vertically aligned with the three lower conveyor lines defined by the conveyor rails 16. The inward or right ends of the rails 16a terminate slightly to the right of the gate 58 of the feed apparatus 86. The outer or left ends of the rails 16a terminate slightly to the right of a sandwich assembler 108, which will be described subsequently.

A horizontal, longitudinally extending rod 110 is attached to and forms a forward continuation of the forward end of each conveyor rail 16a. A similar rod 112 is attached to the rearward end of each rail 16a is a rearward continuation of the rail 16a. The free or rearward ends of the rods 112 are removably carried in any suitable fashion by a horizontal, transversely extending plate 114 which extends across the machine 10. The opposite ends of the plate 114 are secured to the upper extremities of vertical side plates 116 attached at their lower extremities to the machine side walls 12.

The discharge ends of the vertical legs of the right angular rails 16a are secured to blocks 119, FIG. 3, disposed between adjacent pairs of the rails 16a. The blocks 119 are secured to a horizontal, transversely oriented plate 121 which is attached to side plates 123 secured to the machine sides 12.

The forward or free ends of the rods 110 are supported by attachment to other elements, as will be seen, which are attached to the lower ends of a plurality of vertically oriented springs 118 whose upper ends are attached to a horizontal, transversely extending rod 120. The opposite ends of the rod 120 are carried by supports 122 attached to a pair of vertical plates 124 which form a part of the sandwich assembler 108 and which are secured at their lower ends to machine side walls 12, respectively.

As best seen in FIGS. 2 and 3, the cookies 40 are deposited on the upper three conveyor lines in a manner substantially identical to the placement of the cookies 18 on the lower three conveyor lines. As will be seen, the actuation of the cookie advance cylinder 26 which moves the cookies 18 along the lower conveyor lines is also effective to advance the cookies 40 along the upper conveyor lines. For this purpose, as previously indicated, the conveyor pins 38a of the pin support platforms 36 located closest to the discharge end of the machine 10 are made longer so as to not only pass through the spaced apart conveyor rails 16 of the lower conveyor lines, but also between the spaced apart rails 16a of the upper conveyor lines, as best seen in FIG. 2.

SANDWICH ASSEMBLER

As seen in FIGS. 1 through 3, the last station is a sandwich assembler station associated with the assembler 108. The assembler 108 is operable to move cookies 40 downwardly upon the ice cream deposited on the cookies 18, and tamp or squeeze the cookies 40 downwardly until the ice cream is spread outwardly between the cookies 18 and 40 in a uniform manner, and with the height of the assembled ice cream sandwiches being of standard or uniform height to fit within standard packages (not shown).

The assembler 108 comprises a horizontal, transversely oriented top plate 126 secured at its opposite ends to the vertical end plates 124. An air actuated tamper cylinder 128 is secured to the top of the plate 126, with its piston rod extending through a suitable opening in the plate 126 for connection to a horizontal, transversely elongated support plate 130 which overlies the upper three conveyor lines. The plate 130 is vertically movable and includes a pair of upwardly extending rods 132 at its opposite ends, respectively, which are slidable within openings provided in the top plate 126, as best seen in FIG. 1. This keeps the plate 130 from turning in a horizontal plane.

A pair of vertical, downwardly extending clamping blocks 134, one of which is illustrated in FIG. 3, are secured to the support plate 130. The blocks 134 are clamped about a horizontal, transversely extending rod 136, fixing it in the position illustrated. The upper ends of three vertical rods 138, one of which is illustrated in FIG. 3, extend through three openings in the horizontal rod 136, in alignment with the three conveyor lines defined by the rails 16a and the three conveyor lines defined by the rails 16. The rods 138 are held in position by set screws so that their vertical height may be adjusted precisely.

A disk or tamper 140 is secured to the lower end of each of the vertical rods 138, the tampers 140 being operative, as seen in FIG. 3, to tamp or press the cookies 40 downwardly upon the cookies 18 upon extension of the piston rod of the tamper cylinder 128. Actuation of the cylinder 128 in an opposite fashion raises the tampers 140, as will be apparent.

The forward or discharge ends of the rails 16a are constructed in a particular fashion to facilitate transfer of the cookies 40 from the upper conveyor lines to the lower conveyor lines by the tampers 140. More particularly, as best seen in FIGS. 3 and 7 through 11, the forward or discharge ends of the horizontal legs of the lower rails 16 are transversely slit and upwardly deformed to provide upwardly projecting tabs 142 whose free edges face the discharge end of the machine 10 to constrain the cookie 18 from moving rearwardly once it has been moved by the conveyor pins 38a to a position directly underlying the cookies 40.

Each cookie 18 is lightly biased or pressed into firm engagement with the tabs 142 by a pair of arcuate, forwardly projecting spring fingers 144 secured at their rearward extremities to the vertical legs of the conveyor rails 16 for each one of the lower three conveyor lines. The forward extremities of the fingers 144 curve around the sides and forward portions of the cookie 18 to lightly press it against the tabs 142 and thereby precisely locate the cookie 18 in proper position. Proper location of the cookie 18 is initiated by movement of the conveyor pins 38a against the cookie 18, moving it against the fingers 144. Then, when the conveyor pins 38a lower and retract, the fingers 144 bias the cookie against the tabs 142, as previously mentioned.

Similar precise orientation of each cookie 40 on each of the upper three conveyor lines is provided by a pair of elongated, forwardly projecting spring fingers 146 similar to the spring fingers 144. The rearward extremities of the fingers 146 are secured to the vertical legs of the conveyor rails 16a, and the arcuate forward extremities of the fingers 146 curve about the sides and forward portions of the cookie 40.

Figures 7, 8, 9, 10, 11:
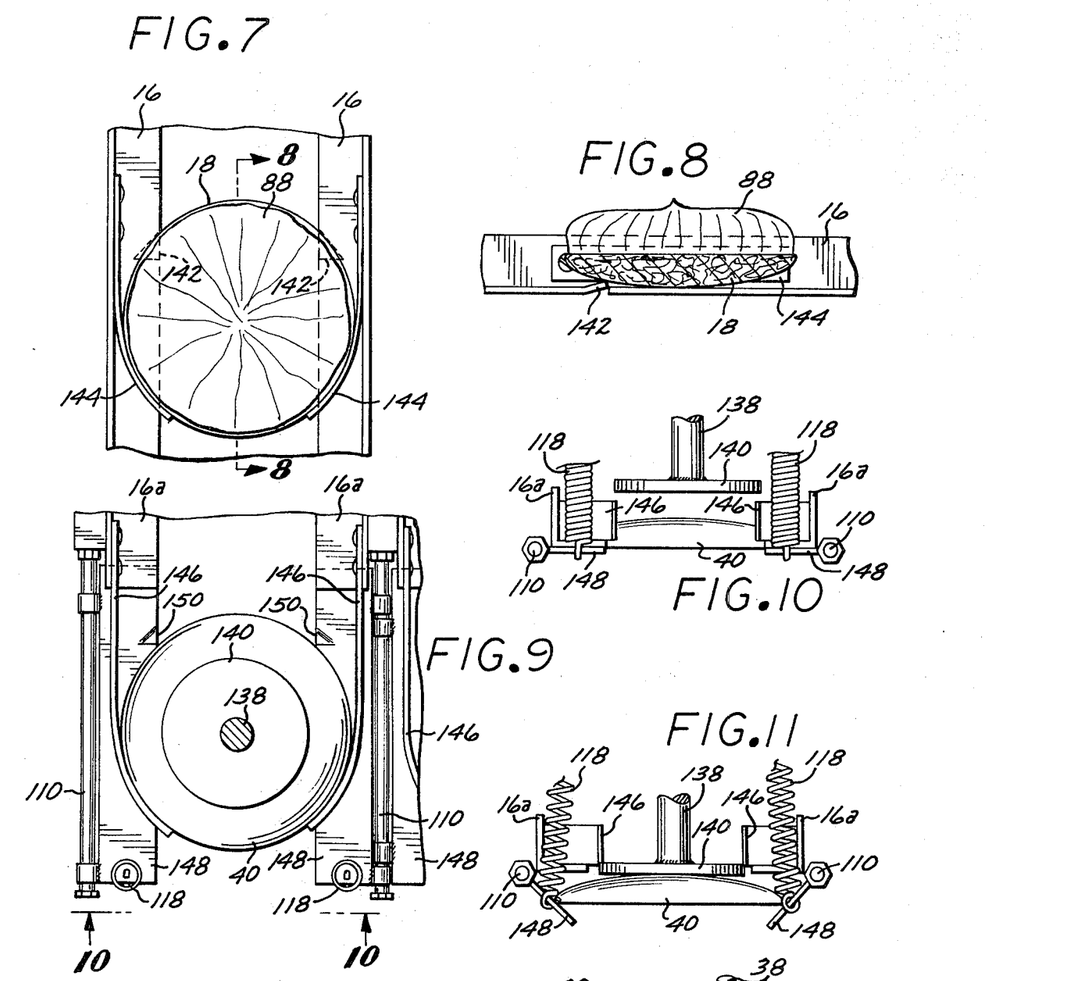
FIG. 7 is an enlarged view taken along the line 7—7 of FIG. 3.
FIG. 8 is a view taken along the line 8—8 of FIG. 7.
FIG. 9 is a view taken along the line 9—9 of FIG. 3.
FIG. 10 is a view taken along the line 10—10 of FIG. 9, and illustrating the upper conveyor rail extensions in their holding position.
FIG. 11 is a view similar to FIG. 10, but illustrating the upper conveyor rail extensions moving toward their discharge position under the impetus of the tamper piston.

The operation of the fingers 146 is similar to that of the fingers 144, except that the locating projections, which are similar to the tabs 142, are not located in the rails 16a. Instead, as seen in FIGS. 9 through 11, they are formed in a pair of horizontal, longitudinally extending rail extensions or transfer flaps 148 which are pivotally attached to the rods 110. The flaps 148 form continuations of the horizontal legs of each pair of conveyor rails 16a defining the upper conveyor lines. The discharge ends of the flaps 148 are secured to the lower ends of the springs 118 to support the discharge extremities of the conveyor rails 16a. In addition, the springs 118 enable downward pivotal movement of the flaps 148 against the bias of the springs 118, as seen in FIG. 11.

The flaps 148 are transversely slit to provide locator tabs 150 similar to the tabs 142 previously described. Movement of the conveyor pins 38a in a discharge direction urges each cookie 40 against a pair of the fingers 146 and, upon lowering and retraction of the conveyor pins 38a, the cookie 40 is lightly urged by the associated pair of fingers 146 against the locator tabs 150, thereby precisely locating the cookie 40 for transfer.

In operation, the downwardly moving tampers 140 press against the cookies 40, pivoting the transfer flaps 148 against the bias of the springs 118 and pressing the cookies 40 onto the ice cream coated cookies 18 located below.

SUMMARY OF INVENTION

With the shuttle 64 is the ready position of FIG. 5, and with a supply of cookies 18 held upwardly in the cylinder 74 by the cookie support 80, the cookie support cylinder 84 is operated to lower the support 80, whereupon the lowermost cookie 18 drops into the first of the three cookie openings 66.

The shuttle cylinder 70 is then actuated to move the shuttle 64 through the intermediate position illustrated in FIG. 6 to the discharge position illustrated in FIG. 4. During this movement two additional cookies 18 are sequentially received in the cookie openings 66, it being particularly noted that the distance between the feed opening defined by the lower end of the cylinder 74 is located above the margins defining the aligned cookie opening 66 a distance less than the thickness of a cookie 18. Consequently, no more than one cookie 18 is permitted to drop into a cookie opening 66 as it comes into alignment with the feed opening.

When the shuttle 64 has reached the discharge position of FIG. 4, the gate cylinder 62 is operated to tilt the gate 58. The cookies 18 slide downwardly upon the three conveyor lines defined by the conveyor rails 16. At this time the cookie locator or conveyor pins 38 and 38a are in their upper positions to receive and locate the cookies 18 coming off the gate 58.

The advance cylinder 26 is next operated to move the cookies 18 in a longitudinal direction, the amount of advance being approximately the diameter of a cookie. In proper sequence with the operations remaining to be described, the conveyor pins 38 and 38a are periodically lowered and retracted a distance approximating the diameter of a cookie. This is done by actuation of the vertical location cylinders 32, followed by actuation of the advance cylinder 26 to retract its piston rod toward the feed end of the machine 10.

When cookies 18 are indexed to the ice cream filling station, nozzle cylinder 90 is actuated to urge the nozzles 100 downwardly adjacent the upper surface of the cookies 18. The flow cylinder 106 is next actuated to force ice cream through the nozzles 100, such actuation being terminated after a predetermined interval. The cylinder 90 is then actuated to raise the nozzles 100 so that the filled cookies 18 can be moved to the next station by the conveyor fingers 38.

As the cookies 18 pass through the second feed apparatus station 86, the cookies 40 are fed onto the three conveyor lines defined by the conveyor rails 16a in a manner identical to the feeding of the cookies 18 onto the lower conveyor rails by the feed apparatus 44. The cookies 40 and 18 are moved along the rails 16a and 16, respectively, in vertical alignment since both are moved by the same conveyor fingers 38a.

When the vertically aligned cookies 18 and 40 reach the station defined by the sandwich assembler 108, the tamper cylinder 128 is actuated to move the tampers 140 against the cookies 40, transferring them onto the ice cream coated lower cookies 18. The assembled cookies are then moved toward the discharge end of the machine by the action of the conveyor pins 38a, being received in any suitable apparatus for packaging (not shown).

As will be apparent, the foregoing operations must be properly sequenced and synchronized. A number of control systems may be utilized for this purpose, but an air actuated or pneumatic system is preferred. One suitable system of this type will next be described. The particular air valves and the mechanisms for actuating them will be described and illustrated only generally or diagrammatically for brevity. Details of such components do not form a part of the present invention and are well known to those skilled in the art.

CONTROL SYSTEM

Figures 13, 14:
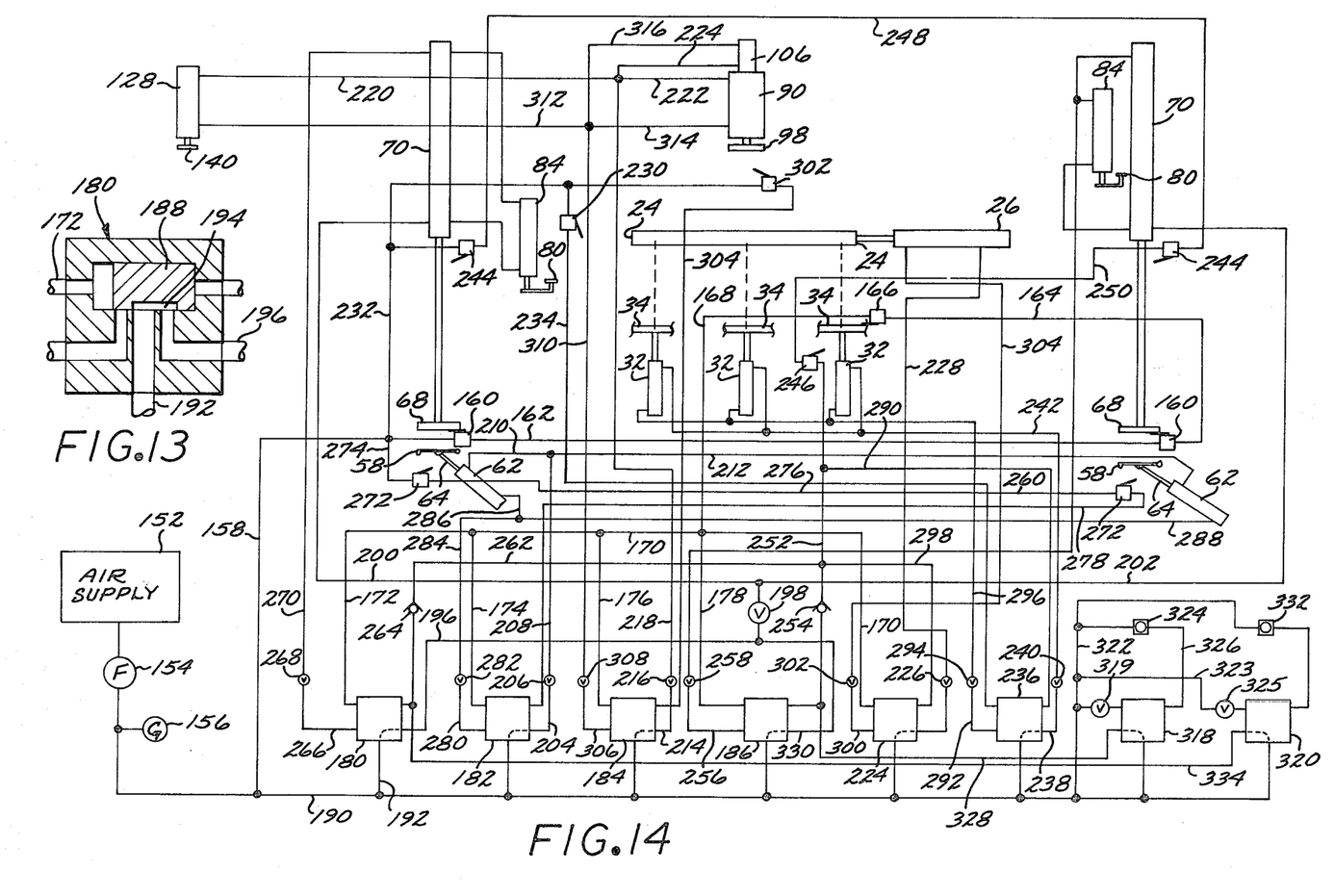
FIG. 13 is an enlarged cross-sectional view of one of the valves utilized in the control system.
FIG. 14 is a diagrammatic view of the control system for operating the machine of FIG. 1.

With particular reference to FIGS. 13 and 14, and certain diagrammatic showings of pertinent switches and valves in the other figures of the drawings, the control system comprises an air source or supply 152 from which air is drawn through a usual air filter 154 and pressure gauge 156. This air passes through a line 158 and, in the operational condition illustrated in FIG. 14, the shuttle cylinders 70 have been actuated to their discharge positions so that their end members 68 have engaged and opened associated air actuated valves 160, whose location is diagrammatically indicated in FIGS. 4 through 6. Also, the conveyor pins 38 and 38a are in their upward, longitudinally retracted positions, the gates 58 are closed, and the cookie supports 80 are in their downward positions.

The valve 160 is of a type which, when its lever or trigger arm is closed in the manner illustrated, opens an air passage through the valve. Consequently, air from line 158 passes through one valve 160, through a line 162, through the other valve 160, and through a line 164 to an air actuated valve 166. The valve 166 is open by virtue of having been engaged by the platform support bar 34 which is not in its up position with the conveyor pins 38 and 38a also being in their upward positions at this time.

Air passes through the valve 166, through a line 168 to a line 170 which carries air through branch lines 172, 174, 176, and 178 to dual path air valves 180, 182, 184, and 186, respectively. Air from line 170 also passes to a fifth dual path air valve 224.

The valve 180 is more particularly illustrated in FIG. 13, and valves 182, 184, and 186 are identical to the valve 180. The valve is armed or triggered in one direction by air passing from the line 172 and moving a piston 188 to the right. This allows air to pass from the air supply line 190 through the valve 180 from a branch line 192. A passage 194 formed in the piston 188 then shunts air from the line 192 to a line 196.

Air from valve 180 passes through a volume control element 198 and through lines 200 and 202 to the ends of the shuttle cylinders 70. This is effective to retract or move the shuttles 74 from their discharge positions of FIG. 4 toward their ready positions of FIG. 5.

It is important to note that the volume control element 198, like other volume control elements hereinafter mentioned, controls the volume of air passing through it. This adjusts the speed with which the associated cylinder or cylinders operate so that proper sequencing with other air cylinders can be established, as will subsequently be apparent.

In addition to causing retraction of the cylinders 70, the air to the cylinders 70 also passes to the cylinders 84 to raise the cookie supports 80. This occurs just prior to retracting movement of the shuttles 64. The supports pass upwardly through the support openings 65 in their respective shuttles 64, and the vertical rods supporting the supports 80 slide within the slots 85 in the shuttles 64.

Contemporaneously with the foregoing, air from the branch line 174 passes through the dual path valve 182 to a line 204, through a volume control element 206, a line 208, and a pair of lines 210 and 212 to the pair of gate cylinders 62, thereby opening the associated gates 58 and discharging cookies onto the conveyor lines. This also occurs just prior to retracting movement of the shuttles 64.

At this time, air also passes from the branch line 176 through the dual path valve 184, through a line 214, a volume control element 216, and a line 218 to a pair of lines 220 and 222 which are connected to the ends of the nozzle cylinder 90 and the tamper cylinder 128. Air also passes from the line 220 to a line 224 which is connected to one end of the flow cylinder 106. As a consequence, ice cream is forced out of the nozzles 100 and, farther down the conveyor lines, the sandwich cookies 18 and 40 are squeezed together.

At this time air also passes from the line 170 to the dual path valve 224, operating it to allow air to pass from line 190 through the valve 224, through a volume control element 226, through a line 228 to one end of the advance cylinder 26 to cause the conveyor pins 38 and 38a to move toward the discharge end of the machine 10 and thereby index all of the cookies just dumped off the gates 58 a distance of one cookie diameter.

When the conveyor pins 38 and 38a have completed this movement, the end member 24 of the conveyor frame will contract and open an air valve 230.

Opening of the air valve 230 allows air to pass from the line 158 to a line 232, through the valve 230, and through a line 234 to a dual path valve 236. This arms the valve 236 to pass air from the supply line 190 to a line 238, through a volume control element 240, and through a line 242 to the vertical location cylinders 32, actuating them in a direction to move the conveyor pins 38 and 38a downwardly preparatory to retraction in a longitudinal direction toward the feed end of the machine 10.

The machine 10 is now in an operational state in which an additional supply of cookies is about to be fed to the pair of shuttles 64. Accordingly, when the shuttles 64 have returned to their ready positions, the end members 68 thereof engage and thereby open a pair of air actuated valves 244, also seen in FIGS. 4 through 6. At this same time the lowering of the conveyor pins 38 and 38a associated with the vertical location cylinders 32 causes the conveyor frame to engage and open an air actuated valve 246.

The opening of the valves 244 and 246 allows air to pass from the line 158, the line 232, through the valve 244 associated with the second feed apparatus 86, and through a line 248 to the other valve 244. Air passes through the open valve 244, through a line 250, through the open valve 246, through a line 252, through a one-way ball check valve 254 to the dual path air valve 186, and arming it for passage of air from the supply line 190 through a line 256. From the line 256, air passes through a volume control element 258, and through a line 260 to the ends of the cookie support cylinder 84 and shuttle cylinder 70 of the first cookie feed apparatus 44. This causes the cookie support 80 to descend, allowing cookies to pass into the cookie openings 66 contemporaneously with movement of the shuttle 64 toward its discharge position.

The same action is duplicated in the second cookie feed apparatus 86. More particularly, air from the line 252 passes through a line 262, through a one-way ball check valve 264 to the dual path valve 180, arming it so that air from the supply line 190 passes through the valve 180 to a line 266. From the line 266 the air passes through a volume control element 268 to a line 270, and to the ends of the cookie support cylinder 84 and shuttle cylinder 70 of the second feed apparatus 86. This causes cookies 40 to be received by the pair of shuttles 64.

Just prior to the aforementioned movement of the shuttles 74 to their discharge positions, the gates 58 have closed. This occurs by reason of the previously described opening of the gates 58, which causes a pair of air actuated valves 272 to be engaged and opened. The effect of the opening of the valves 272 is to immediately move the gates 58 back to their closed positions, the closing action being delayed sufficiently by a volume control element 282 to permit the cookies to first drop off the open gates. This occurs by virtue of the passage of air from the line 158 through a line 274, through one of the valves 272, through a line 276, through the other valves 272, through a line 278 to the dual path valve 182, arming it so that supply air from the line 190 passes from the valve 182 to a line 280. From the line 280 the air passes through the volume control element 282, through a line 284, and then through lines 286 and 288 to the gate cylinders 62 to close the associated gates 58.

Prior to the shuttles 64 reaching their discharge positions, the conveyor pins 38 and 38a are first retracted and then raised so as to assist in properly locating the dropped cookies on the conveyor lines. For this purpose, an air actuated valve 246 is provided which is actuated as soon as the conveyor frame associated with the vertical location cylinders 32 moves to its downward position. The valve 246 allows air to pass from a line 252 to a line 298 which is connected to the dual path valve 224, arming the valve 224 so that supply air from a line 290 passes through the valve 224 to a line 300. From the line 300 air passes through a volume control element 302, through a line 304, to the advance cylinder 26, causing the conveyor frame associated with the pins 38 and 38a to be retracted in a longitudinal direction toward the feed end of the machine 10. In addition, opening of the valve 246 also causes air to pass through the line 290 and to the dual path valve 236, arming it so that supply air from the line 192 passes through the valve 236 to a line 292. From the line 292 air passes through a volume control element 294, through a line 296 and to the ends of the vertical location cylinders 32. The element 294 is adjusted so that the cylinders 32 raise the associated conveyor pins 38 and 38a only after the pins 38 and 38a have been fully retracted.

The cut off of the flow cylinder 106, retraction of the nozzles 100 by the nozzle cylinder 90, and retraction of the tamper 140 by the tamper cylinder 128 occur as the cookies are being indexed toward the discharge end of the machine 10. The volume control elements associated with these components are adjusted accordingly. The action of the cylinders 106, 90 and 128 is otherwise independent of the action of the other components of the machine 10. That is, when the nozzles 100 reach their downward positions, an air actuated valve 302 is opened, allowing air from line 232 to pass through the open valve 302 to a line 304 which connects to the dual path valve 184 arming it for passage of air from the supply line 190 to a line 306. From the line 306 air passes through a volume control element 308 to a line 310, and through lines 312, 314, and 316, to the tamper cylinder 128, nozzle cylinder 90 and flow cylinder 106, respectively.

An additional pair of valves 318 and 320 are provided which are substantially identical to the valve 180 illustrated in FIG. 13, except that only one flow path, indicated in dotted outline, is provided through the lower portion of each valve. These valves are provided to facilitate removal of cookies in the event that the cookies become jammed in the shuttles 64. Once the cookies are removed, operation of the valves 318 and 320 steps or advances the associated shuttles 64 to feed fresh cookies into the machine 10 independently of operation of the other components of the machine.

Thus, air from supply line 190 passes through a line 322 to a pushbutton operated air valve 324. Pressing upon the valve 324 allows air to pass through the valve 324 to a line 326 to the valve 318. This air overcomes the action of air passing to the valve 318 through a volume control element 319, arming the valve 318 so that air from the supply line 190 passes through the valve 318 to a line 328. Line 328 connects to a line 330 which arms the dual path valve 186 to accept air from the supply line 190 for passage through the valve 186 to the line 256. Air passes from the line 256 through the volume control element 258 and the line 260 to the cookie support cylinder 84 and shuttle cylinder 70. This advances the associated shuttle 64 of the first feed apparatus 44 as long as the pushbutton valve 324 is depressed. When the pushbutton valve 324 is released, air is metered to the opposite side of the valve 318 through the volume control element 319, causing the internal piston of the valve 318 to cut off the passage of air to the line 328.

Similarly, operation of a pushbutton valve 332 is operative to pass air from the supply line 190 and the line 322 to the valve 320. This overcomes the bleed air normally applied to the valve 320 through a line 323 and volume control element 325, and arms the valve 320 to accept supply air from line 190 and shunt it to a line 334.

Air from line 334 arms the dual path valve 180 for passage of air from the line 192 through the valve 180 to the line 266. Air passes from the line 266 through line 270 to the cookie support cylinder 84 and shuttle cylinder 70 of the second feed apparatus 86, advancing the associated shuttle 64 as desired, and only as long as the pushbutton 332 is depressed.

Although shuttles 64 have been described which receive cookies as the shuttles move toward their discharge positions, it will be apparent that a dual arrangement can be provided in which the cookie holders are omitted and the shuttles are arranged to also receive cookies during movement toward their ready positions. Such an arrangement would require a side-by-side arrangement of conveyor lines, which would be fed alternately by the reciprocating shuttles.

Various modifications and changes may be made with regard to the foregoing detailed description without departing from the spirit of the invention.

I claim:

1. Product feed apparatus for locating a plurality of products adjacent a corresponding plurality of transversely spaced apart conveyor means, said apparatus comprising:
    an elongated shuttle guide adapted for location adjacent and in transverse orientation relative to said plurality of conveyor means, said shuttle guide including a gate opening overlying said plurality of conveyor means, and including a gate normally covering said gate opening;
    holding means for holding a stack of products and including an extremity defining a feed opening;
    a shuttle movable on said shuttle guide between a first position on one side of said feed opening to a discharge position on the other side of said feed opening, said shuttle including a plurality of product openings extending through said shuttle and each having a depth approximately the thickness of the product, said product openings being successively alignable with said feed opening on movement of said shuttle from said first position to said discharge position thereby to transfer products from said feed opening to said product openings, respectively, the surface margins defining each said product opening and said feed opening upon alignment therebetween being spaced apart a distance less than the thickness of the product, said product openings being aligned with said plurality of conveyor means, respectively, in said discharge position of said shuttle, said gate being operable to uncover said gate opening for discharging products in said product openings onto said plurality of conveyor means, respectively;
    a product support reciprocable between an upper position above said shuttle guide for engagement with the lowermost product in said stack of products, and a lower position below said shuttle guide to release said stack of products for descent;
    means for moving said product support toward said upper position during movement of said shuttle toward said first position, and for moving said product support toward said lower position during movement of said shuttle toward said discharge position; and
    means for moving said shuttle from said first position and past said feed opening to said discharge position thereby to orient products in said product openings in overlying relation to said plurality of conveyor means, respectively.

2. Product feed apparatus according to claim 1 wherein said shuttle is slotted to permit movement of said shuttle to said first position during location of said product support in said upper position.

3. Product feed apparatus for locating a plurality of first products upon a corresponding plurality of transversely spaced apart first conveyor means, and for locating a plurality of second products upon a corresponding plurality of transversely spaced apart second conveyor means located above and in vertical alignment with said first conveyor means, said apparatus comprising:
    an elongated first shuttle guide adapted for location adjacent and in transverse orientation relative to said first conveyor means;
    first holding means for holding a stack of said first products and including an extremity defining a first feed opening;
    a first shuttle movable on said first shuttle guide between a first position on one side of said first feed opening to a discharge position on the other side of said first feed opening, said first shuttle including a plurality of first product openings each having a depth approximately the thickness of one of said first products, said first product openings being successively alignable with said first feed opening on movement of said first shuttle from said first position to said discharge position thereby to transfer said first products from said first feed opening to said first product openings, respectively, the surface margins defining each said first product opening and said first feed opening upon alignment therebetween being spaced apart a distance less than the thickness of the product, said first product openings being aligned with said first conveyor means, respectively, in said discharge position of said first shuttle;
    first means for moving said first shuttle from said first position and past said first feed opening to said discharge position thereby to orient said first products in said first product openings in overlying relation to said first conveyor means, respectively;
    an elongated second shuttle guide longitudinally spaced apart from said first shuttle guide and adapted for location adjacent and in transverse orientation relative to said second conveyor means;
    second holding means for holding a stack of said second products and including an extremity defining a second feed opening;
    a second shuttle movable on said second shuttle guide between a first position on one side of said second feed opening to a discharge position on the other side of said second feed opening, said second shuttle including a plurality of second product openings each having a depth approximately the thickness of one of said second products, said second product openings being successively alignable with said second feed opening on movement of said second shuttle from said first position to said discharge position thereby to transfer said second products from said second feed opening to said second product openings, respectively, the surface margins defining each said second product opening and said second feed opening upon alignment therebetween being spaced apart a distance less than the thickness of the product, said second product openings being aligned with said second conveyor means, respectively, in said discharge position of said second shuttle;

second means for moving said second shuttle from said first position and past said second feed opening to said discharge position thereby to orient said second products in said second product openings in overlying relation to said second conveyor means, respectively;

advancing means operable to advance said first and second products along said first and second conveyor means, respectively; and assembler means operable to transfer said second products on said second conveyor means onto said first products on said first conveyor means.

4. Product feed apparatus according to claim 3 and including filler means located between said first and second shuttle guides and operable to apply filler to said first products as said first products are advanced by said advancing means toward said second shuttle guide.

5. Product feed apparatus according to claim 3 wherein said advancing means comprise a plurality of vertically oriented pins upwardly movable to upper positions between each of said first products, and downwardly movable to lower positions underlying said first products, said advancing means further comprising actuating means operable for intermittently first moving said pins to said upper positions and then moving said pins longitudinally toward said second shuttle guide, and alternately operable for intermittently first moving said pins to said lower positions and then moving said pins longitudinally toward said first shuttle guide.

6. Product feed apparatus comprising:

a plurality of transversely spaced apart, longitudinally extending conveyor means having feed extremities and discharge extremities;

an elongated shuttle guide having a gate opening overlying said plurality of conveyor means and further having a gate normally covering said gate opening and operable to uncover said gate opening;

holding means for holding a stack of products and including an extremity defining a feed opening;

a product support reciprocable between an upper position above said shuttle guide for engagement with the lowermost product in said stack of products to support said stack of products above said shuttle guide, and a lower position below said shuttle guide to release said stack of products for descent;

a shuttle movable on said shuttle guide between a first position on one side of the said feed opening to a discharge position on the other side of said feed opening, said shuttle including a plurality of product openings each having a depth approximately the thickness of the product, said product openings being successively alignable with said feed opening on movement of said shuttle from said first position to said discharge position for transferring products from said feed opening to said product openings, respectively, in said lower position of said product support, the surface margins defining each said product opening and said feed opening upon alignment therebetween being spaced apart a distance less than the thickness of the product, said product openings being aligned with said gate opening in said discharge position of said shuttle, said shuttle being slotted to enable said shuttle to move relative to said product support during location of said product support in said upper position;

shuttle operator means operative to move said shuttle from said first position and past said feed opening to said discharge position thereby to orient products in said product openings in overlying relation to said plurality of conveyor means, respectively; and advancing means including a plurality of pins movable to advancing positions between said products on said plurality of conveyor means, and retracting positions below said products, further including first means for moving said pins between said advancing and retracting positions, and further including second means operative in timed relation to said first means to move said pins in said advancing positions toward said discharge extremities of said plurality of conveyor means, and further operative to move said pins in said retracting positions toward said feed extremities of said plurality of conveyor means.

* * * * *